United States Patent
Lee et al.

(10) Patent No.: US 8,762,947 B2
(45) Date of Patent: Jun. 24, 2014

(54) SYSTEM, METHOD AND COMPUTER PROGRAM PRODUCT FOR DEBUGGING AN ASSERTION

(75) Inventors: Jong Lee, Pleasanton, CA (US); Aaron Fiske, San Francisco, CA (US)

(73) Assignee: salesforce.com, Inc., San Francisco, CA (US)

( * ) Notice: Subject to any disclaimer, the term of this patent is extended or adjusted under 35 U.S.C. 154(b) by 614 days.

(21) Appl. No.: 12/962,532

(22) Filed: Dec. 7, 2010

(65) Prior Publication Data

US 2011/0246969 A1    Oct. 6, 2011

Related U.S. Application Data

(60) Provisional application No. 61/320,118, filed on Apr. 1, 2010.

(51) Int. Cl.
*G06F 9/44* (2006.01)

(52) U.S. Cl.
USPC .......................................... 717/124; 717/127

(58) Field of Classification Search
None
See application file for complete search history.

(56) References Cited

U.S. PATENT DOCUMENTS

| | | | |
|---|---|---|---|
| 6,853,963 B1* | 2/2005 | Apfelbaum et al. | 703/2 |
| 7,209,929 B2 | 4/2007 | Dominguez, Jr. et al. | |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | |
| 2005/0055605 A1* | 3/2005 | Blumenthal et al. | 714/13 |
| 2005/0065925 A1 | 3/2005 | Weissman et al. | |
| 2005/0177775 A1* | 8/2005 | Qadeer et al. | 714/38 |
| 2005/0198622 A1* | 9/2005 | Ahluwalia et al. | 717/130 |
| 2005/0204345 A1* | 9/2005 | Rivera et al. | 717/127 |
| 2005/0223022 A1 | 10/2005 | Weissman et al. | |
| 2005/0283478 A1 | 12/2005 | Choi et al. | |
| 2006/0206834 A1 | 9/2006 | Fisher et al. | |
| 2008/0086482 A1* | 4/2008 | Weissman | 707/10 |
| 2009/0249439 A1* | 10/2009 | Olden et al. | 726/1 |
| 2011/0138453 A1* | 6/2011 | Verma et al. | 726/8 |
| 2012/0278791 A1* | 11/2012 | Geist | 717/125 |

OTHER PUBLICATIONS

Richard Grimes, "Developing Applications with Visual Studio .Net", 2002, Addison-Wesley Professional, section 9.2.*
John Robbins, "Debugging Applications for Microsoft .NET and Microsoft Windows", 2003, Microsoft Press, Second Edition, section 3.1.*
Oasis, "Security Assertion Markup Language (SAML) V2.0 Technical Overview", 2008, retrieved from: http://docs.oasis-open.org/security/saml/Post2.0/sstc-saml-tech-overview-2.0-cd-02.pdf.*
Mel's space, "Assertion with SUPERASSERT.NET", 2008, retrieved from: http://mleeb.wordpress.com/2008/05/12/assertions-with-superassert-net/.*

(Continued)

*Primary Examiner* — Jue Louie
(74) *Attorney, Agent, or Firm* — Zilka-Kotab, PC

(57) ABSTRACT

In accordance with embodiments, there are provided mechanisms and methods for debugging an assertion. These mechanisms and methods for debugging an assertion can enable improved interpretation and analysis of data validation results, more efficient development associated with data validation, etc.

23 Claims, 4 Drawing Sheets

(56) References Cited

OTHER PUBLICATIONS

Kuhlmann et al. "Modeling and validating Mondex scenarios described in UML and OCL with USE", 2008, Formal Aspects of Computing, pp. 79-100.*

Sun Microsystems, "Using the BPEL Designer and Service Engine", 2009, Sun Microsystems, Part No. 821-0017, pp. 133-134, retrieved from: http://docs.oracle.com/cd/E19509-01/821-0017/821-0017.pdf.*

Craig Landis, "ADFS: SAML Tokens and Validation Issues when Federated with TFIM", Nov. 2008, Ask the Directory Services Team, Microsoft's official enterprise support blog for AD DS and more, retrieved from: http://blogs.technet.com/b/askds/archive/2008/11/21/adfs-saml-tokens-and-validation-issues-when-federated-with-tfim.aspx.*

Ncashell, "Integrating Google Apps and Novell Access Manager using SAML2", Jul. 2009, retrieved from: http://web.archive.org/web/20090712101405/http://www.novell.com/communities/node/8645/integrating-google-apps-and-novell-access-manager-using-saml2.*

U.S. Appl. No. 60/828,192, filed Oct. 4, 2006.

* cited by examiner

SYSTEM, METHOD AND COMPUTER PROGRAM PRODUCT FOR DEBUGGING AN ASSERTION

CLAIM OF PRIORITY

This application claims the benefit of U.S. Provisional Patent Application 61/320,118, entitled "Federated Single-Sign-On Debugger in a Multi-tenant Environment," by Lee et al., filed Apr. 1, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more implementations relate generally to data validation, and more particularly to debugging data used for validation.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Data validation is a common practice of conventional systems. For example, a first login service may desire to validate a user login with a second login service (e.g., in a single sign-on environment, etc.). Unfortunately, conventional validation techniques have been associated with various limitations.

Just by way of example, traditional methods of validating a user login with a login service may require a specific format that may prove difficult to follow. Additionally, any errors encountered during the validation may result in cryptic error codes that may prove difficult and time-consuming to manually interpret and address. Further, errors encountered during the validation may stop the validation process from continuing. Accordingly, it is desirable to provide techniques that improve the interpretation and analysis of conventional validation techniques.

BRIEF SUMMARY

In accordance with embodiments, there are provided mechanisms and methods for debugging an assertion. These mechanisms and methods for debugging an assertion can enable improved interpretation and analysis of data validation results, more efficient development associated with data validation, etc.

In an embodiment and by way of example, a method for debugging an assertion is provided. In one embodiment, an assertion is received at a debugger. Additionally, the assertion is debugged, utilizing the debugger. Further, results of the debugging are returned.

While one or more implementations and techniques are described with reference to an embodiment in which debugging an assertion is implemented in a system having an application server providing a front end for an on-demand database system capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

General Overview

Systems and methods are provided for debugging an assertion.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers.

Next, mechanisms and methods for debugging an assertion will be described with reference to example embodiments.

Figure 1:
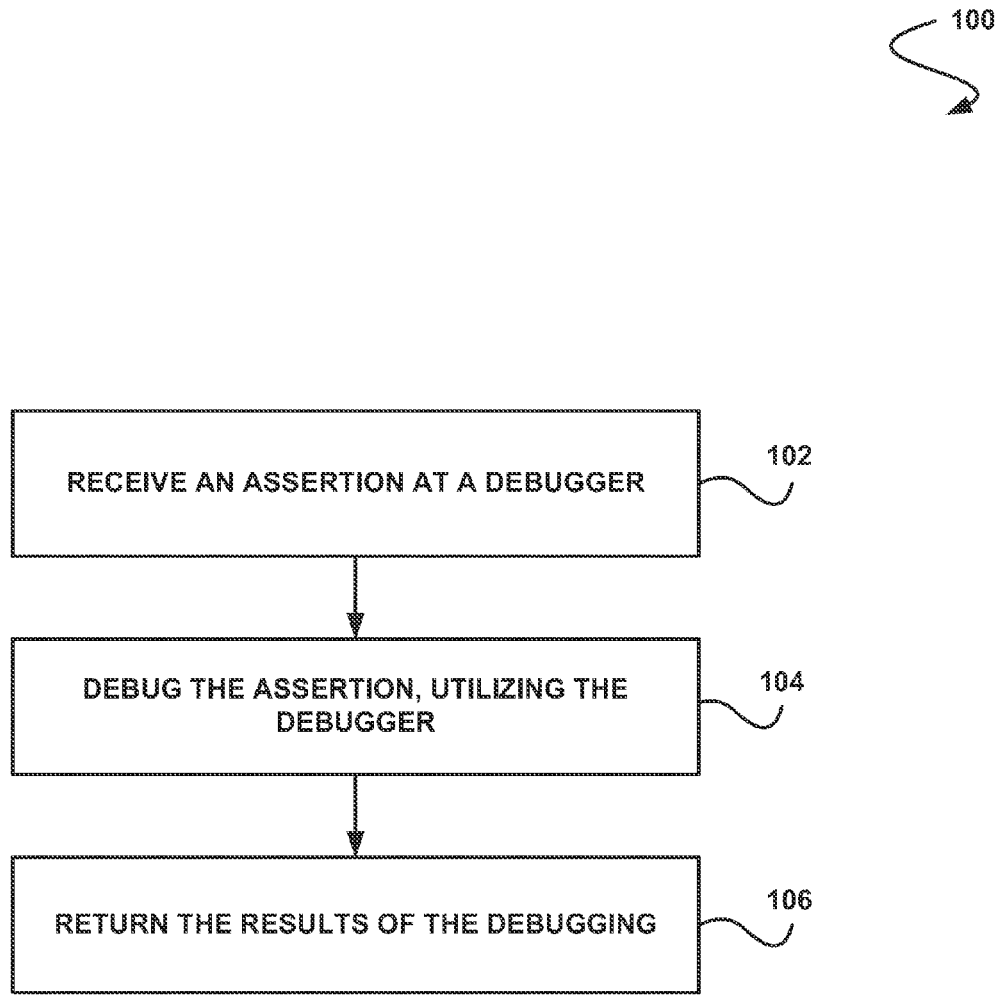
FIG. 1 illustrates a method for debugging an assertion, in accordance with one embodiment.

FIG. 1 illustrates a method 100 for debugging an assertion, in accordance with one embodiment. As shown in operation 102, an assertion is received at a debugger. In one embodiment, the assertion may include a message. For example, the assertion may include a request to verify one or more elements of data. In another example, the assertion may include a request to log a user into the system. In another embodiment, the assertion may include one or more elements of data. For example, the assertion may include a user name, a timestamp, a certificate (e.g., an authorization certificate, etc.), etc.

In yet another embodiment, the assertion may be encoded (e.g., utilizing Extensible Markup Language (XML), base64 encoding, etc.). Further, in one embodiment, the assertion may be sent from one entity (e.g., a server, a multi-tenant on-demand database system, etc.) to another entity. For example, a user may be associated with a first entity (e.g., logged into the first entity, verified by the first entity, etc.), and may desire to log into a second entity. Additionally, the assertion may be sent from the second entity to the first entity in an attempt to verify the user and log the user into the second entity.

In another embodiment, the assertion may be of a specific file type. For example, the assertion may include an Extensible Markup Language (XML) file, a base64 encoded format file, etc. In yet another embodiment, the assertion may be associated with a user of an entity (e.g., a client, a server, a multi-tenant on-demand database system, etc.). For example, the assertion may be associated with a particular user of an organization of a multi-tenant on-demand database system.

Additionally, in one embodiment, the debugger may include software that is installed on an entity. For example, the debugger may be installed on a client, a server, a cloud, a multi-tenant on-demand database system, etc. In another embodiment, the assertion may be received at the debugger if the assertion fails to be validated. For example, the assertion may be received at the debugger if one or more errors are detected during the validation of the assertion (e.g., at the entity, etc.). In yet another embodiment, the debugger may intercept the assertion. For example, a first system may send the assertion to a second system, where the debugger is installed on the second system. Further, the debugger may intercept the assertion at the second system.

Also, in one embodiment, the assertion may be cached (e.g., at the system where the debugger is installed) before or after processing the assertion and may be sent to the debugger if an issue is found while processing (e.g., parsing, etc.) the assertion at the system. For example, one or more errors may be determined during the processing of the assertion at the system, and the cached assertion may be sent to the debugger as a result of determining the errors. In another example, the cached assertion may be sent to the debugger in response to the user launching a debugger page. In another embodiment, the cached assertion may be associated with a user of the system, and the debugger may be automatically populated with the assertion based on the user's information within the system. Further, in another embodiment, the assertion may be recreated. For example, the assertion may be recreated in response to a request (e.g., by a user, by the debugger, etc.), and may be input into the debugger.

Further still, in one embodiment, the assertion may be input into the debugger utilizing a user interface (UI). For example, the text of the assertion may be copied and pasted into a field of a UI page associated with the debugger, and may be submitted to the debugger once a button is selected on the UI page (e.g., a "validate" button, etc.). In another embodiment, the assertion may be input into the debugger as part of an initial setup.

Additionally, it should be noted that, as described above, such multi-tenant on-demand database system may include any service that relies on a database system that is accessible over a network, in which various elements of hardware and software of the database system may be shared by one or more customers (e.g. tenants). For instance, a given application server may simultaneously process requests for a great number of customers, and a given database table may store rows for a potentially much greater number of customers. Various examples of such a multi-tenant on-demand database system will be set forth in the context of different embodiments that will be described during reference to subsequent figures.

Furthermore, as shown in operation 104, the assertion is debugged, utilizing the debugger. In one embodiment, debugging the assertion may include monitoring the validation of the assertion by the debugger. For example, the debugger may monitor each step of the system validation process while the system validates the assertion (e.g., utilizing a validator of the system, etc.). Additionally, in another embodiment, the debugger may record one or more errors that occur during the validation of the assertion. For example, the validation of the assertion may include checking a plurality of elements associated with the assertion (e.g., a time of a last login, a time stamp, a certificate, a username, etc.), and one or more errors may occur if one or more of the elements of the assertion are found to be invalid. Additionally, these errors may be recorded by the debugger. In another embodiment, the one or more errors may each be represented by an error code, an error condition, etc.

In yet another embodiment, the debugging may continue after an error is encountered during validation. For example, instead of exiting after a first error is discovered during validation, the error may be logged and the debugging and validation may continue until all elements associated with the assertion are checked. In another embodiment, overrides may be used to continue running the validator even when an error is found. In this way, the entirety of the assertion may be debugged in one pass. Additionally, in one embodiment, the debugging may include associating the one or more errors with a user of the system.

Also, as shown in operation 106, results of the debugging are returned. In one embodiment, the results may include the results of every step of the validation that was monitored by the debugger, along with an indication of whether each step caused an error vas successful, depending on whether the validation passed or failed for that step. In another embodiment, the results of the debugging may be displayed utilizing an interface. For example, the results may be displayed to a user, administrator, etc. via a user interface.

In yet another embodiment, the results of the debugging may include one or more translated error codes. For example, the debugger may translate an error code that was discovered during the debugging into a natural language description of the error that may include details such as a specific description of an error (e.g., "user does not exist," etc.), a likely cause of the error (e.g., "time stamp was five hours out of date," etc.), a possible solution for the error (e.g., "need to account for different time zone," etc.), etc. In another embodiment, the error codes may be displayed in addition to their translations. In this way, the recipient of the results of the debugging may be able to easily understand what errors occurred during the validation, and what errors need to be addressed in the assertion.

In yet another embodiment, the results of the debugging may include one or more symbols or colors associated with the results. For example, one or more green bars may be associated with elements of the assertion that did not cause an error during debugging. In another example, one or more red bars may be associated with elements of the assertion that did cause an error during debugging. Further, in another embodiment, the results of the debugging may include a report. For example, a report may be returned that lists every element of the assertion, along with an indication of whether the element caused an error during debugging.

Additionally, in one embodiment, the results of the debugging may be sent as an electronic mail message (e.g., to an administrator, to a user associated with the assertion, etc.). In yet another embodiment, the results of the debugging may be presented to a user when they log into an organization of the system. In still another embodiment, one or more additional actions may be performed, based on the results. For example, if one or more particular errors are detected during the debugging (e.g., an expired certificate, etc.), or if one or more particular errors are detected multiple times over a predetermined time period (e.g., signifying a malicious system attack, etc.), an email alert may be sent (e.g., to a system administrator, etc.).

In this way, a user may be provided with a debugger resource where they can simply enter an assertion in a field, press a button, and determined whether the assertion would have been accepted by the system. Additionally, error messages provided as a result of the debugging may be clear and explanatory, and less cryptic than a generic numerical error code. Further, all elements of the assertion may be debugged at once, even if errors are encountered before all elements are debugged.

Figure 2:
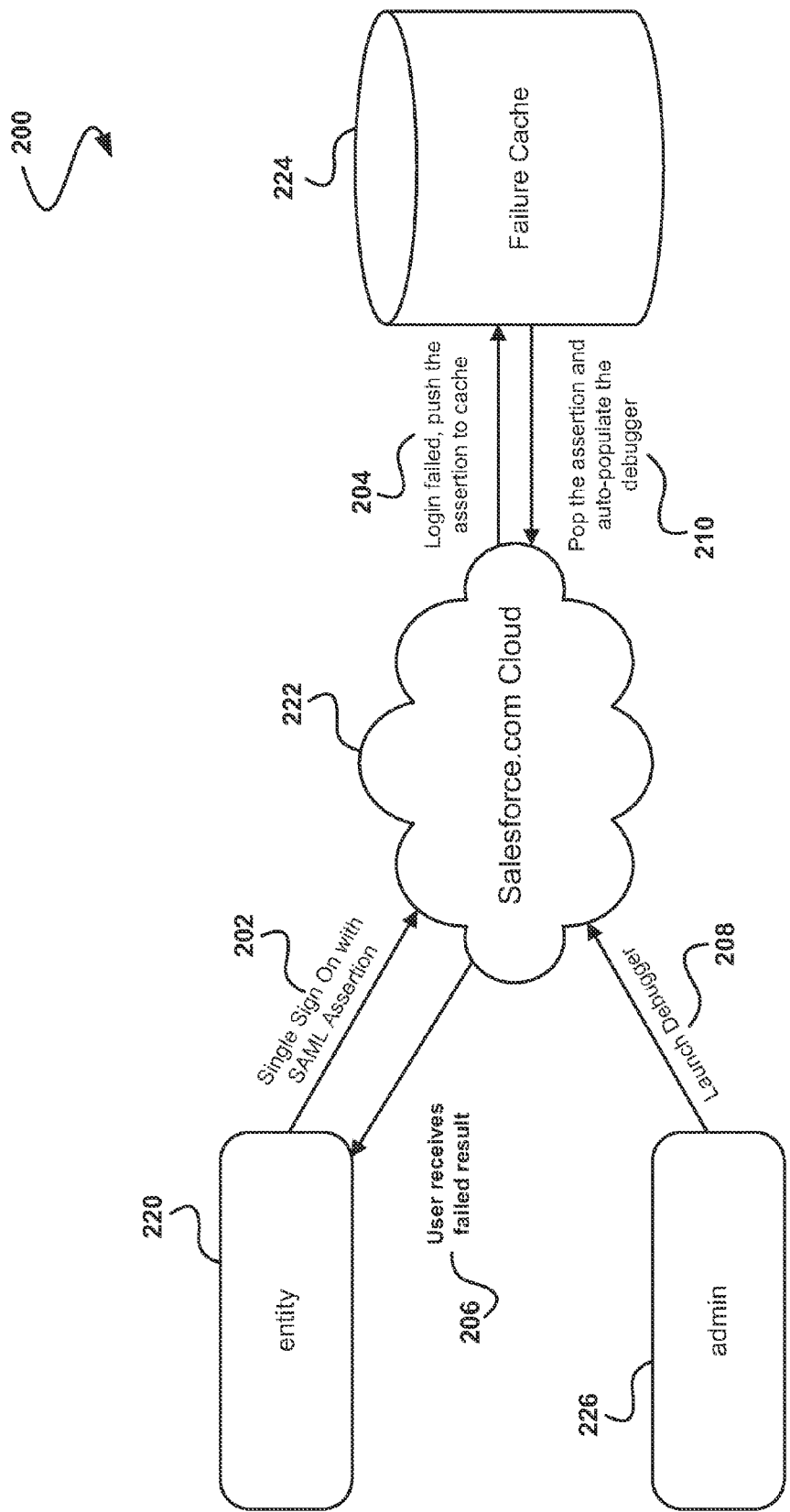
FIG. 2 illustrates a system and method for initiating debugging of an assertion, in accordance with another embodiment.

FIG. 2 illustrates a system and method 200 for initiating debugging of an assertion, in accordance with another embodiment. As an option, the present system and method 200 may be carried out in the context of the functionality of FIG. 1. Of course, however, the system and method 200 may be carried out in any desired environment. The aforementioned definitions may apply during the present description.

As shown in operation 202, an entity 220 attempts to sign on (e.g., log in, etc.) to a system cloud 222 by sending the system cloud 222 an assertion (e.g., an encoded security association markup language (SAML) assertion, etc.). In one embodiment, the assertion may be associated with a user. For example, the user may be currently logged into the entity 220. In another example, the entity may send the assertion in an attempt to log the user on to the system cloud 222. In yet another example, the assertion may ask the system cloud 222 whether a user exists, whether the user is valid, whether the user has one or more permissions, etc. In this way, the entity may request a determination of whether the user has been verified by the system cloud 222.

Additionally, as shown in operation 204, it is determined that the attempt to sign on to the system cloud has failed, and the assertion is pushed to the failure cache 224. In one embodiment, the failure cache 224 may be associated with an organization. For example, the failure cache 224 may be located in an organization associated with the user. In another embodiment, the assertion is stored at the failure cache 224.

Further, as shown in operation 206, the entity 220 receives a failed result from the system cloud 222. For example, the entity 220 may receive an indication from the system cloud 222 that the user could not be verified, that the user could not be logged in to the system cloud 222, etc. Further still, as shown in operation 208, an administrator 226 launches a debugger at the system cloud 222. In one embodiment, the administrator 226 may launch the debugger in response to the failed result sent to the entity 220. In another embodiment, the administrator 226 may be in charge of setting up the communication procedure between the entity 220 and the system cloud 222, In yet another embodiment, the administrator 226 may launch the debugger from a user interface located at the system cloud 222.

Also, as shown in operation 210, the assertion is popped from the failure cache 224 and is automatically populated into a debugger within the system cloud 222. In one embodiment, the debugger may debug the assertion sent from the failure cache 224 and may return results of the debugging to the administrator 226. In this way, the administrator 226 may be able to easily initiate the debugging of a failed login assertion within the system cloud 222.

System Overview

Figure 3:
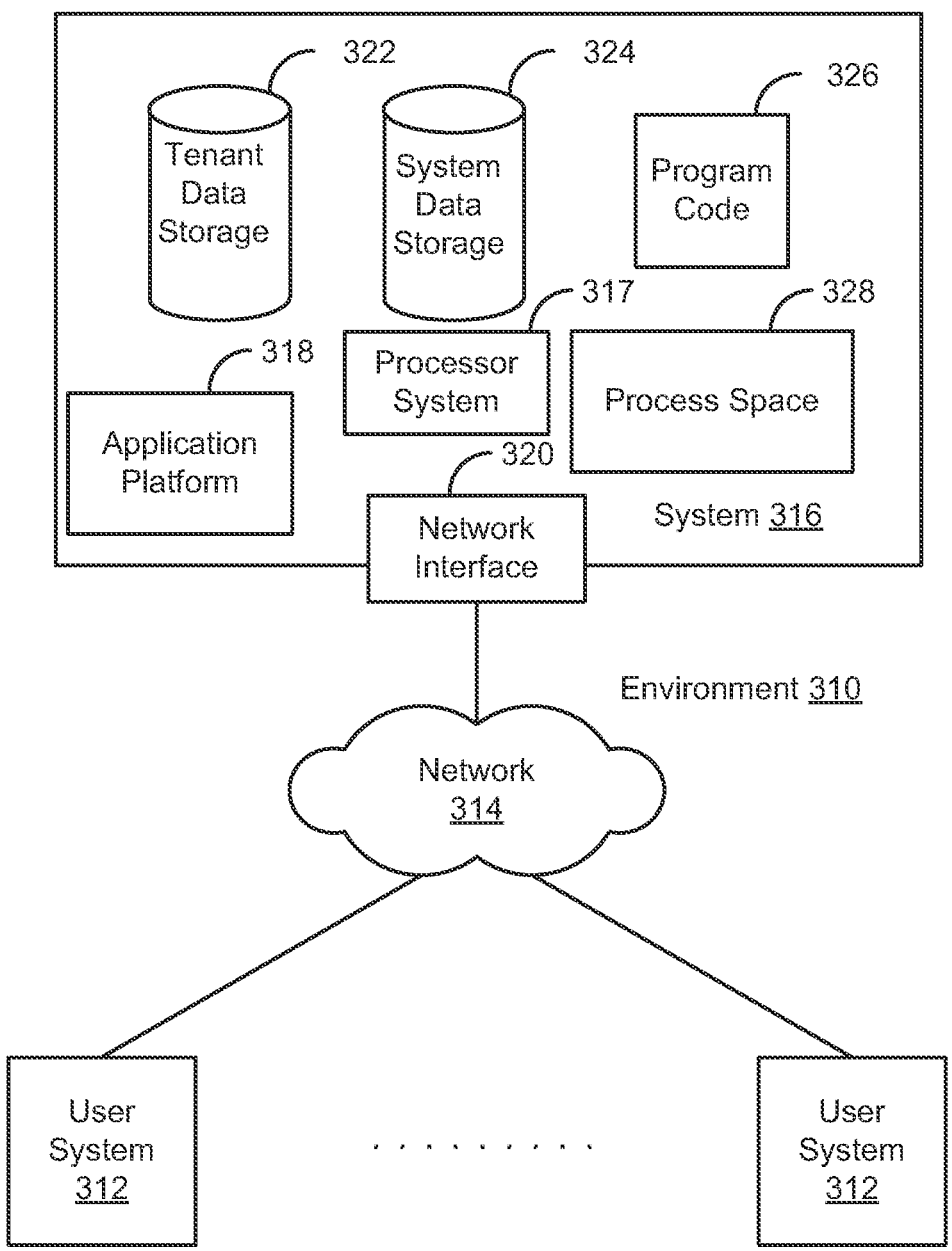
FIG. 3 illustrates a block diagram of an example of an environment wherein an on-demand database system might be used.

FIG. 3 illustrates a block diagram of an environment 310 wherein an on-demand database system might be used. Environment 310 may include user systems 312, network 314, system 316, processor system 317, application platform 318, network interface 320, tenant data storage 322, system data storage 324, program code 326, and process space 328. In other embodiments, environment 310 may not have all of the components listed and/or may have other elements instead of, or in addition to, those listed above.

Environment 310 is an environment in which an on-demand database system exists. User system 312 may be any machine or system that is used by a user to access a database user system. For example, any of user systems 312 can be a handheld computing device, a mobile phone, a laptop computer, a work station, and/or a network of computing devices. As illustrated in FIG. 3 (and in more detail in FIG. 4) user systems 312 might interact via a network 314 with an on-demand database system, which is system 316.

An on-demand database system, such as system 316, is a database system that is made available to outside users that do not need to necessarily be concerned with building and/or maintaining the database system, but instead may be available for their use when the users need the database system (e.g., on the demand of the users). Some on-demand database systems may store information from one or more tenants stored into tables of a common database image to form a multi-tenant database system (MTS). Accordingly, "on-demand database system 316" and "system 316" will be used interchangeably herein. A database image may include one or more database objects. A relational database management system (RDMS) or the equivalent may execute storage and retrieval of information against the database object(s). Application platform 318 may be a framework that allows the applications of system 316 to run, such as the hardware and/or software, e.g., the operating system. In an embodiment, on-demand database system 316 may include an application platform 318 that enables creation, managing and executing one or more applications developed by the provider of the on-demand database system, users accessing the on-demand database system via user systems 312, or third party application developers accessing the on-demand database system via user systems 312.

The users of user systems 312 may differ in their respective capacities, and the capacity of a particular user system 312 might be entirely determined by permissions (permission levels) for the current user. For example, where a salesperson is using a particular user system 312 to interact with system 316, that user system has the capacities allotted to that salesperson. However, while an administrator is using that user system to interact with system 316, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 314 is any network or combination of networks of devices that communicate with one another. For example, network 314 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein, However, it should be understood that the networks that the one or more implementations might use are not so limited, although TCP/IP is a frequently implemented protocol.

User systems 312 might communicate with system 316 using TCP/IP and, at a higher network level, use other common Internet protocols to communicate, such as HTTP, FTP, AFS, WAP, etc. In an example where HTTP is used, user system 312 might include an HTTP client commonly referred to as a "browser" for sending and receiving HTTP messages to and from an HTTP server at system 316. Such an HTTP server might be implemented as the sole network interface between system 316 and network 314, but other techniques might be used as well or instead. In some implementations, the interface between system 316 and network 314 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 316, shown in FIG. 3, implements a web-based customer relationship management (CRM) system. For example, in one embodiment, system 316 includes application servers configured to implement and execute CRM software applications as well as provide related data, code, forms, webpages and other information to and from user systems 312 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 316 implements applications other than, or in addition to, a CRM application. For example, system 316 may provide tenant access to multiple hosted (standard and custom) applications, including a CRM application. User (or third party developer) applications, which may or may not include CRM, may be supported by the application platform 318, which manages creation, storage of the applications into one or more database objects and executing of the applications in a virtual machine in the process space of the system 316.

One arrangement for elements of system 316 is shown in FIG. 3, including a network interface 320, application platform 318, tenant data storage 322 for tenant data 323, system data storage 324 for system data 325 accessible to system 316 and possibly multiple tenants, program code 326 for implementing various functions of system 316, and a process space 328 for executing MTS system processes and tenant-specific processes, such as running applications as part of an application hosting service. Additional processes that may execute on system 316 include database indexing processes.

Several elements in the system shown in FIG. 3 include conventional, well-known elements that are explained only briefly here. For example, each user system 312 could include a desktop personal computer, workstation, laptop, PDA, cell phone, or any wireless access protocol (WAP) enabled device or any other computing device capable of interfacing directly or indirectly to the Internet or other network connection. User system 312 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 312 to access, process and view information, pages and applications available to it from system 316 over network 314. Each user system 312 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 316 or other systems or servers. For example, the user interface device can be used to access data and applications hosted by system 316, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 312 and all of its components are operator configurable using applications, such as a browser, including computer code run using a central processing unit such as an Intel Pentium® processor or the like. Similarly, system 316 (and additional instances of an NITS, where more than one is present) and all of their components might be operator configurable using application (s) including computer code to run using a central processing unit such as processor system 317, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 316 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 316 is configured to provide webpages, forms, applications, data and media content to user (client) systems 312 to support the access by user systems 312 as tenants of system 316. As such, system 316 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 4:
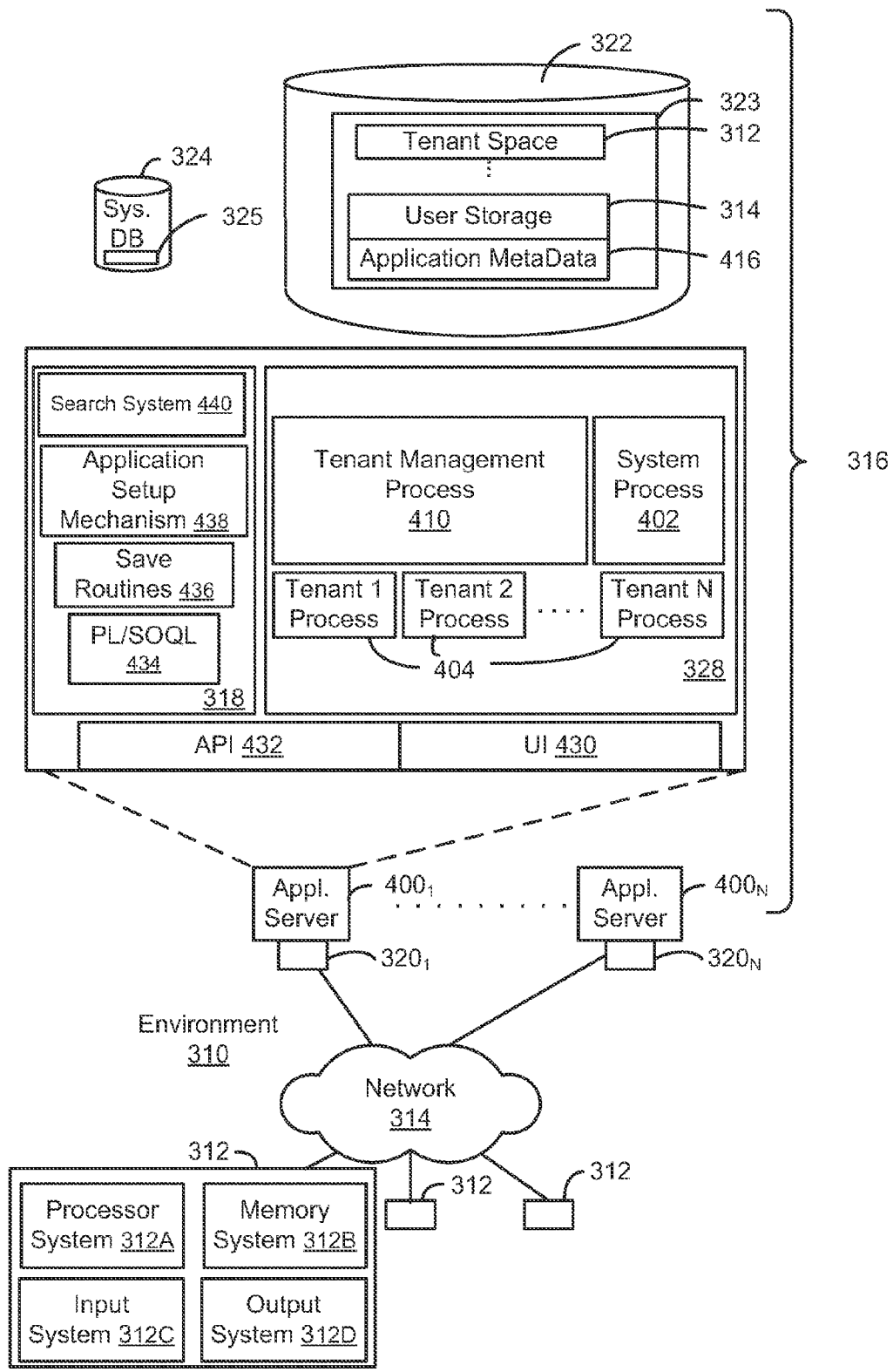
FIG. 4 illustrates a block diagram of an embodiment of elements of FIG. 4 and various possible interconnections between these elements.

FIG. 4 also illustrates environment 310. However, in FIG. 4 elements of system 316 and various interconnections in an embodiment are further illustrated. FIG. 4 shows that user system 312 may include processor system 312A, memory system 312B, input system 312C, and output system 312D. FIG. 4 shows network 314 and system 316. FIG. 4 also shows that system 316 may include tenant data storage 322, tenant data 323, system data storage 324, system data 325, User interface (UI) 430, Application Program interface (API) 432, PL/SOQL 434, save routines 436, application setup mechanism 438, applications servers $400_1$-$400_N$, system process space 402, tenant process spaces 404, tenant management process space 410, tenant storage area 412, user storage 414, and application metadata 416. In other embodiments, environment 310 may not have the same elements as those listed above and/or may have other elements instead of, or in addition to, those listed above.

User system 312, network 314, system 316, tenant data storage 322, and system data storage 324 were discussed above in FIG. 3. Regarding user system 312, processor system 312A may be any combination of one or more processors. Memory system 312B may be any combination of one or more memory devices, short term, and/or long term memory. Input system 312C may be any combination of input devices, such as one or more keyboards, mice, trackballs, scanners, cameras, and/or interfaces to networks. Output system 312D may be any combination of output devices, such as one or more monitors, printers, and/or interfaces to networks. As shown by FIG. 4, system 316 may include a network interface 320 (of FIG. 3) implemented as a set of HTTP application servers 400, an application platform 318, tenant data storage 322, and system data storage 324. Also shown is system process space 402, including individual tenant process spaces 404 and a tenant management process space 410. Each application server 400 may be configured to tenant data storage 322 and the tenant data 323 therein, and system data storage 324 and the system data 325 therein to serve requests of user systems 312. The tenant data 323 might be divided into individual tenant storage areas 412, which can be either a physical arrangement and/or a logical arrangement of data. Within each tenant storage area 412, user storage 414 and application metadata 416 might be similarly allocated for each user. For example, a copy of a user's most recently used (MRU) items might be stored to user storage 414. Similarly, a copy of MRU items for an entire organization that is a tenant tnight be stored to tenant storage area 412. A UI 430 provides a user interface and an API 432 provides an application programmer interface to system 316 resident processes to users and/or developers at user systems 312. The tenant data and the system data may be stored in various databases, such as one or more Oracle™ databases.

Application platform 318 includes an application setup mechanism 438 that supports application developers' creation and management of applications, which may be saved as metadata into tenant data storage 322 by save routines 436 for execution by subscribers as one or more tenant process spaces 404 managed by tenant management process 410 for example. Invocations to such applications may be coded using PL/SOQL 434 that provides a programming language style interface extension to API 432. A detailed description of some PL/SOQL language embodiments is discussed in commonly owned co-pending U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, which is incorporated in its entirety herein for all purposes. Invocations to applications may be detected by one or more system processes, which manages retrieving application metadata 416 for the subscriber makingthe invocation and executing the metadata as an application in a virtual machine.

Each application server 400 may be communicably coupled to database systems, e.g., having access to system data 325 and tenant data 323, via a different network connection. For example, one application server $400_1$ might be coupled via the network 314 (e.g., the Internet), another application server $400_{N-1}$ might be coupled via a direct network link, and another application server $400_N$ might be coupled by yet a different network connection, Transfer Control Protocol and Internet Protocol (TCP/IP) are typical protocols for communicating between application servers 400 and the database system. However, it will be apparent to one skilled in the art that other transport protocols may be used to optimize the system depending on the network interconnect used.

In certain embodiments, each application server 400 is configured to handle requests for any user associated with any organization that is a tenant. Because it is desirable to be able to add and remove application servers from the server pool at any time for any reason, there is preferably no server affinity for a user and/or organization to a specific application server 400. In one embodiment, therefore, an interface system implementing a load balancing function (e.g., an F5 Big-IP load balancer) is communicably coupled between the application servers 400 and the user systems 312 to distribute requests to the application servers 400. In one embodiment, the load balancer uses a least connections algorithm to route user requests to the application servers 400. Other examples of load balancing algorithms, such as round robin and observed response time, also can be used. For example, in certain embodiments, three consecutive requests from the same user could hit three different application servers 400, and three requests from different users could hit the same application server 400. In this manner, system 316 is multi-tenant, wherein system 316 handles storage of and access to, different objects, data and applications across disparate users and organizations.

As an example of storage, one tenant might be a company that employs a sales force where each salesperson uses system 316 to manage their sales process. Thus, a user might maintain contact data, leads data, customer follow-up data, performance data, goals and progress data, etc., all applicable to that user's personal sales process (e.g., in tenant data storage 322). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 316 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 316 might also maintain system level data usable by multiple tenants or other data. Such system level data might include industry reports, news, postings, and the like that are sharable among tenants.

In certain embodiments, user systems 31 (which may be client systems) communicate with application servers 400 to request and update system-level and tenant-level data from system 316 that may require sending one or more queries to tenant data storage 322 and/or system data storage 324. System 316 (e.g., an application server 400 in system 316) automatically generates one or more SQL statements (e.g., one or more SQL queries) that are designed to access the desired information. System data storage 324 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A computer program product embodied on a non-transitory computer readable medium, comprising:
   computer code for receiving at a system cloud a single sign on with a security association markup language (SAML) assertion;
   computer code for determining that the single sign on with the SAML assertion has failed;
   computer code for receiving the SAML assertion at a debugger if the single sign on is determined to have failed, wherein the SAML assertion includes a name and authorization certificate, and the SAML assertion is automatically populated into the debugger from a failure cache storing the SAML assertion;
   computer code for debugging the SAML assertion, utilizing the debugger, wherein the debugging includes validating the SAML assertion by checking the name and the authorization certificate included in the SAML assertion; and
   computer code for returning results of the debugging including an indication of whether an error occurred during the validating of the SAML assertion.

2. The computer program product of claim 1, wherein the SAML assertion includes a request to log a user into a system.

3. The computer program product of claim 1, wherein the debugger is installed on a multi-tenant on-demand database system.

4. The computer program product of claim 1, wherein the computer program product further comprises computer code for receiving the SAML assertion at the debugger if the SAML assertion fails to be validated.

5. The computer program product of claim 4, wherein the computer program product further comprises computer code for receiving the SAML assertion at the debugger if one or more errors are detected during a validation of the SAML assertion.

6. The computer program product of claim 1, wherein the computer program product further comprises computer code for intercepting the SAML assertion at the debugger.

7. The computer program product of claim 1, wherein the computer program product further comprises computer code for caching the SAML assertion before or after processing the SAML assertion and for sending the SAML assertion to the debugger if an issue is found while processing the SAML assertion.

8. The computer program product of claim 7, wherein the computer program product further comprises computer code for sending the cached SAML assertion to the debugger in response to a user launching a debugger page.

9. The computer program product of claim 1, wherein the computer program product further comprises computer code for inputting the SAML assertion into the debugger utilizing a user interface (UI).

10. The computer program product of claim 9, wherein the computer program product further comprises computer code for copying and pasting text of the SAML assertion into a field of a UI page associated with the debugger, and computer code for transmitting the SAML assertion to the debugger once a button is selected on the UI page.

11. The computer program product of claim 1, wherein debugging the assertion includes monitoring the validation of the assertion by the debugger.

12. The computer program product of claim 11, wherein the computer program product further comprises computer code for recording at the debugger one or more errors that occur during the validation of the SAML assertion.

13. The computer program product of claim 11, wherein the computer program product further comprises computer code for continuing the debugging after an error is encountered during validation.

14. The computer program product of claim 1 wherein the computer program product further comprises computer code for using overrides to continue running a validator even when an error is found.

15. The computer program product of claim 11, wherein the results include results of every step of the validation that was monitored by the debugger, along with an indication of whether each step caused an error or was successful, depending on whether the validation passed or failed for that step.

16. The computer program product of claim 1, wherein the results of the debugging include one or more translated error codes.

17. The computer program product of claim 1, wherein the assertion is received at the debugger by a user:
    inputting the assertion into a field of a user interface, and
    selecting a button on the user interface to submit the assertion to the debugger.

18. The computer program product of claim 1, wherein debugging the assertion include determining whether the name is invalid.

19. The computer program product of claim 1, wherein debugging the assertion include determining whether the authorization certificate is invalid.

20. The computer program product of claim 1, wherein the results of the debugging include one or more translated error codes, wherein the translated error codes are codes for errors discovered during the debugging that are translated into a natural language description.

21. The computer program product of claim 20, wherein an error is discovered during the debugging when the authorization certificate is determined to be expired.

22. A method, comprising:
    receiving at a system cloud a single sign on with a security association markup language (SAML) assertion;
    determining that the single sign on with the SAML assertion has failed;
    receiving the SAML assertion at a debugger if the single sign on is determined to have failed, wherein the SAML assertion includes a name and authorization certificate, and the SAML assertion is automatically populated into the debugger from a failure cache storing the SAML assertion;
    debugging the SAML assertion, utilizing the debugger, wherein the debugging includes validating the SAML assertion by checking the name and the authorization certificate included in the SAML assertion; and
    returning results of the debugging including an indication of whether an error occurred during the validating of the SAML assertion.

23. An apparatus, comprising:
    a memory comprising instructions executable by one or more hardware processors; and
    the one or more hardware processors coupled to the memory, the one or more hardware processors executing the instructions to:
        receive at a system cloud a single sign on with a security association markup language (SAML) assertion;
        determine that the single sign on with the SAML assertion has failed;
        receive the SAML assertion at a debugger if the single sign on is determined to have failed, wherein the SAML assertion includes a name and authorization certificate, and the SAML assertion is automatically populated into the debugger from a failure cache storing the SAML assertion;
        debug the SAML assertion, utilizing the debugger, wherein the debugging includes validating the SAML assertion by checking the name and the authorization certificate included in the SAML assertion; and
        return results of the debugging including an indication of whether an error occurred during the validating of the SAML assertion.

* * * * *